US012432693B2

(12) United States Patent
Tang

(10) Patent No.: US 12,432,693 B2
(45) Date of Patent: Sep. 30, 2025

(54) PAGING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/076,526

(22) Filed: Dec. 7, 2022

(65) Prior Publication Data

US 2023/0106920 A1  Apr. 6, 2023

Related U.S. Application Data

(63) Continuation of application No. 16/856,998, filed on Apr. 23, 2020, now Pat. No. 11,553,455, which is a
(Continued)

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC .............. H04W 72/23; H04W 68/005; H04W 52/0232; H04W 52/0235; H04W 72/044;
(Continued)

(56) References Cited

U.S. PATENT DOCUMENTS 11,178,637 B2 * 11/2021 Liu .................. H04L 5/0091
11,251,921 B2 *  2/2022 Kwak ............ H04W 72/0453
(Continued)

FOREIGN PATENT DOCUMENTS

CN        1250581 A    4/2000
CN      101379723 A    3/2009
(Continued)

OTHER PUBLICATIONS

XP051304215. "R1-1710136 Guangdong OPPO Mobile Telecom" on NR paging design and transmission, Jun. 16, 2017. See part II, discussion.
(Continued)

*Primary Examiner* — David Q Nguyen
(74) *Attorney, Agent, or Firm* — Ladas & Parry LLP

(57) ABSTRACT

Embodiments of the present disclosure disclose a paging method, a terminal device and a network device, the method includes: determining, by a terminal device, at least one paging bandwidth for carrying a paging message of the terminal device, where each paging bandwidth in the at least one paging bandwidth is not greater than a bandwidth of a minimum bandwidth capacity of the terminal device; and receiving, by the terminal device, the paging message on the at least one paging bandwidth. The method, terminal device and network device of the embodiments of the present disclosure can avoid the problem that the terminal device being paged cannot perform reception due to that the paging bandwidth exceeds the capacity of the terminal device.

16 Claims, 4 Drawing Sheets

Related U.S. Application Data continuation of application No. PCT/CN2017/109399, filed on Nov. 3, 2017.

(58) Field of Classification Search
CPC ..... H04W 68/02; H04W 48/16; H04W 76/27; H04W 48/10; H04W 72/0453; H04W 74/08; H04W 72/54; H04W 72/02; H04W 56/0035; H04W 56/00; H04B 7/0695; H04L 5/0053; H04L 1/0023; H04L 5/0094; H04L 5/005
USPC .................................. 370/328, 329, 330, 331
See application file for complete search history.

(56) References Cited

U.S. PATENT DOCUMENTS

| | | | |
|---|---|---|---|
| 2006/0094440 | A1 | 5/2006 | Meier et al. |
| 2014/0274091 | A1 | 9/2014 | Das et al. |
| 2017/0070312 | A1* | 3/2017 | Yi ................. H04W 72/541 |
| 2017/0367069 | A1* | 12/2017 | Agiwal ............. H04B 7/088 |
| 2019/0132109 | A1 | 5/2019 | Zhou |
| 2019/0132857 | A1 | 5/2019 | Babaei |
| 2019/0229789 | A1* | 7/2019 | Zhang ............. H04B 7/0617 |
| 2019/0327669 | A1* | 10/2019 | Liu ................... H04W 68/02 |
| 2020/0163048 | A1 | 5/2020 | Kim et al. |
| 2020/0178129 | A1 | 6/2020 | Siomina et al. |
| 2020/0252807 | A1 | 8/2020 | Rune |
| 2020/0267687 | A1 | 8/2020 | Harada et al. |
| 2020/0280955 | A1 | 9/2020 | Liu |
| 2020/0404617 | A1* | 12/2020 | Murray ............ H04W 68/02 |

FOREIGN PATENT DOCUMENTS

| | | |
|---|---|---|
| CN | 102387596 A | 3/2012 |
| CN | 107078890 A | 8/2017 |
| JP | 2009524976 A | 7/2009 |
| JP | 2011503911 A | 1/2011 |
| JP | 2014531854 A | 11/2014 |
| KR | 10-2015-010-5602 A | 9/2015 |
| WO | 2008022782 A1 | 2/2008 |
| WO | 2018126965 A1 | 7/2018 |
| WO | 2019058627 A1 | 3/2019 |
| WO | 2019084923 A1 | 5/2019 |

OTHER PUBLICATIONS

XP051339139, "R1-1715677 Guangdong OPPO Mobile Telecom" On NR paging design and transmission, Sep. 17, 2017. See part II, discussion.
International Search Report in the international application No. PCT/CN2017/109399, mailed on Jul. 25, 2018.
Written Opinion of the International Searching Authority in the international application No. PCT/CN2017/109399, mailed on Jul. 19, 2018 with English translation provided by Google Translate.
The EESR of corresponding European application No. 17930876.4, dated Jul. 21, 2020.
ERICSSON: "On bandwidth parts", 3GPP Draft; R1-1712963, 3rd Generation Partnership Project 3GPP), Mobile Competence Centre; 650, Route Des Lucioles; F-06921 Sophia Antipolis Cedex: France. vol. RAN WG1, no. Prague, Czech Republic; Aug. 21, 2017-Aug. 25, 2017 Aug. 20, 2017(Aug. 20, 2017), XP051315762.
ERICSSON: "On NR paging design", 3GPP Draft; R1-1706013_PAGING, 3rd Generation Partnership Project (3GPP), Mobile Competence Centre; 650, Route Des Lucioles; F-06921 Sophia-Antipolis Cedex; France, vol. RAN WG1, no. Spokane, US; Apr. 3, 2017-Apr. 7, 2017 Apr. 2, 2017(Apr. 2, 2017), XP051244121.
3GPP TS 36.304 V14.4.0 (Sep. 2017); 3rd Generation Partnership Project; Technical Specification Group Radio Access Network; Evolved Universal Terrestrial Radio Access (E-UTRA); User Equipment (UE) procedures in idle mode (Release 14).
The first Office Action of corresponding Chinese application No. 202010307056.7, dated May 8, 2021 with search report.
The first Ofice Action of corresponding Korean application 10-2020-7005622, dated May 28, 2021.
The second Office Action of corresponding Chinese application No. 202010307056.7, dated Aug. 9, 2021.
The first Office Action of corresponding Indian application No. 202017020282, dated Aug. 13, 2021.
The first Office Action of corresponding Japanese application No. 2020-511911, dated Oct. 8, 2021.
The EESR of corresponding European application No. 21199452.0, dated Jan. 17, 2022.
The the first OA of the parallel KR application No. 10-2022-7003801, dated May 23, 2022.
Samsung, Flexible BW supports in NR, R2-1704501, 3GPP TSG-RAN WG2 NR #98 Meeting, Hangzhou, China, May 15-19, 2017.
Vivo, Remaining details on NR paging design, R1-1717462, 3GPP TSG RAN WG1 Meeting #90bis, Prague, Czech Republic, Oct. 9-13, 2017.
The the first OA of the parallel CN application No. 201780093218.8 dated Apr. 18, 2024.
The the first OA of the parallel EP application No. 21199452.0, dated May 3, 2024.
MediaTek Inc. Discussion on Paging design, R1-1707818,3GPP TSG RAN WG1 Meeting #89 Hangzhou, China, May 15-19, 2017.
Wang Mai et al., "Paging message and its monitoring algorithm in LTE network." Modern Science&Technology of Telecommunications, Issue No. 10, Oct. 2009, 8 pages.
The first OA of the parallel JP application No. 2023-065987 dated Jul. 26, 2024.
The NOA of the parallel CN application No. 2017800932188 dated Aug. 30, 2024.
The Decision of Refusal of the parallel JP application No. 2023-065987 dated Dec. 13, 2024.

* cited by examiner

PAGING METHOD, TERMINAL DEVICE AND NETWORK DEVICE

CROSS-REFERENCE TO RELATED APPLICATION

This application is a continuation of U.S. application Ser. No. 16/856,998, filed on Apr. 23, 2020, which is a continuation of International Application No. PCT/CN2017/109399, filed on Nov. 3, 2017. The disclosures of the aforementioned applications are hereby incorporated by reference in their entireties.

TECHNICAL FIELD

Embodiments of the present disclosure relate to the field of communication, and a paging method, a terminal device and a network device.

BACKGROUND

In a system bandwidth, there is a paging bandwidth for carrying a paging message. In the prior art, there may be a problem that the terminal device cannot receive the paging message due to that a capacity of the terminal device does not match the paging bandwidth.

SUMMARY

Considering this, embodiments of the present disclosure provide a paging method, a terminal device and a network device, which can avoid the problem that the terminal device cannot perform reception due to that the paging bandwidth exceeds the capacity of the terminal device.

In a first aspect, a paging method is provided, including: determining, by a terminal device, at least one paging bandwidth for carrying a paging message of the terminal device, where each paging bandwidth in the at least one paging bandwidth is not greater than a bandwidth of a minimum bandwidth capacity of the terminal device; and receiving, by the terminal device, the paging message on the at least one paging bandwidth.

By considering the bandwidth of the minimum bandwidth capacity of the terminal device when configuring the paging bandwidth, the problem that the terminal device cannot receive the paging message due to the insufficient bandwidth capacity of the terminal device can be avoided.

In an embodiment, the network device can determine bandwidth capacities of all terminal devices in a cell it covers at a certain moment in advance, and configure paging bandwidths in a system bandwidth according to a minimum bandwidth capacity, so that each paging bandwidth is not greater than a bandwidth of the minimum bandwidth capacity, thereby all terminal devices in the cell covered by the network device can receive a paging message.

In a possible implementation, the method further includes: determining, by the terminal device, a plurality of paging bandwidths for carrying a paging message, where each paging bandwidth in the plurality of paging bandwidths is not greater than the bandwidth of the minimum bandwidth capacity; the determining, by a terminal device, at least one paging bandwidth for carrying a paging message of the terminal device, includes: determining, by the terminal device, the at least one paging bandwidth from the plurality of paging bandwidths.

In a possible implementation, the method further includes: receiving, by the terminal device, configuration information, which is sent by the network device, of the plurality of paging bandwidths; the determining, by a terminal device, at least one paging bandwidth for carrying a paging message of the terminal device, includes: determining, by the terminal device, a frequency domain position of each paging bandwidth in the at least one paging bandwidth according to an identity of the terminal device and the configuration information of the plurality of paging bandwidths.

In an embodiment, the plurality of paging bandwidths in the system bandwidths can be configured in advance by the network device or agreed according to a protocol, for example, it can be preset in the terminal device.

In an embodiment, the plurality of paging bandwidths defined in the system bandwidth can be distributed to a plurality of different BWPs, so that the loads being paged can be averaged on different BWPs, and part of the paging bandwidths from the plurality of paging bandwidth can also be in the same BWP.

In a possible implementation, the configuration information of the plurality of paging bandwidths includes frequency domain position information of each paging bandwidth in the plurality of paging bandwidths and/or frequency domain offset information of each paging bandwidth in the plurality of paging bandwidths.

In a possible implementation, the configuration information of the plurality of paging bandwidths is carried in remaining minimum system information (RMSI).

In an embodiment, the configuration information can also be carried in other system information (OSI).

In a possible implementation, frequency domain positions of at least two of the plurality of paging bandwidths are incompletely overlapped.

In a possible implementation, the plurality of paging bandwidths belong to a plurality of paging bandwidth sets, the plurality of paging bandwidth sets respectively correspond to a plurality groups of paging parameters, and the paging parameters are used to determine a paging frame and/or a paging occasion.

In an embodiment, paging parameters corresponding to different paging bandwidth sets can be independently configured, while paging parameters of paging bandwidths in the same paging bandwidth set are commonly configured.

In an embodiment, the number of paging bandwidth in each paging bandwidth set can be the same or different.

In a possible implementation, paging bandwidths of the same paging bandwidth set belong to the same bandwidth part (BWP).

By independently configuring paging parameters of different paging bandwidths or different bandwidth sets, the network device has certain flexibility when transmitting a paging message.

In an embodiment, for different paging bandwidths the network device can also use different beams to transmit the paging message to the terminal device, and different beams can perform time-shared transmission in TDM mode, so as to improve a resource utilization.

In a possible implementation, the paging parameters are carried in remaining minimum system information (RMSI) or other system information (OSI).

In a second aspect, a paging method is provided, including: determining, by a network device, a terminal device to be paged; and transmitting, by the network device, a paging message to the terminal device on at least one paging bandwidth, where each paging bandwidth in the at least one paging bandwidth is not greater than a bandwidth of a minimum bandwidth capacity of the terminal device.

In a possible implementation, the method further includes: transmitting, by the network device, configuration information of a plurality of paging bandwidths for carrying a paging message to the terminal device, where the configuration information of the plurality of paging bandwidths is used for the terminal device to determine frequency domain position of the at least one paging bandwidth, where each paging bandwidth in the plurality of paging bandwidths is not greater than the bandwidth of the minimum bandwidth capacity.

In a possible implementation, the configuration information of the plurality of paging bandwidths includes frequency domain position information of each paging bandwidth in the plurality of paging bandwidths and/or frequency domain offset information of each paging bandwidth in the plurality of paging bandwidths.

In a possible implementation, the configuration information of the plurality of paging bandwidths is carried in remaining minimum system information (RMSI).

In a possible implementation, frequency domain positions of at least two of the plurality of paging bandwidths are incompletely overlapped.

In a possible implementation, the plurality of paging bandwidths belong to a plurality of paging bandwidth sets, the plurality of paging bandwidth sets respectively correspond to a plurality groups of paging parameters, and the paging parameters are used to determine a paging frame and/or a paging occasion.

In a possible implementation, paging bandwidths of the same paging bandwidth set belongs to the same bandwidth part (BWP).

In a possible implementation, the paging parameters are carried in remaining minimum system information (RMSI) or other system information (OSI).

In a third aspect, a terminal device is provided, configured to execute the method in the first aspect or any possible implementation of the first aspect. The terminal device includes units configured to execute the method in the first aspect or any possible implementation of the first aspect.

In a fourth aspect, a network device is provided, configured to execute the method in the second aspect or any possible implementation of the second aspect. The network device includes units configured to execute the method in the second aspect or any possible implementation of the second aspect.

In a fifth aspect, a terminal device is provided, including a memory, a processor, an input interface and an output interface, where the memory, processor, input interface and output interface are connected through a bus system. The memory is configured to store instructions, the processor is configured to execute the instructions stored in the memory for executing the method in the first aspect or any possible implementation of the first aspect. In a sixth aspect, a network device is provided, including a memory, a processor, an input interface and an output interface, where the memory, processor, input interface and output interface are connected through a bus system. The memory is configured to store instructions, the processor is configured to execute the instructions stored in the memory for executing the method in the second aspect or any possible implementation of the second aspect.

In a seventh aspect, a computer storage medium is provided, configured to store computer software instructions used for executing the method in the first aspect or any possible implementation of the first aspect, or the method in the second aspect or any possible implementation of the second aspect, including programs designed for executing the above aspects.

In an eighth aspect, a computer program product is provided, including instructions, which, when executed on a computer, cause the computer to execute the method in the first aspect or any implementation of the first aspect, or the method in the second aspect or any implementation of the second aspect.

These or other aspects of the present disclosure will be more concise and understandable in the description of the following embodiments.

DESCRIPTION OF EMBODIMENTS

Figure 1:
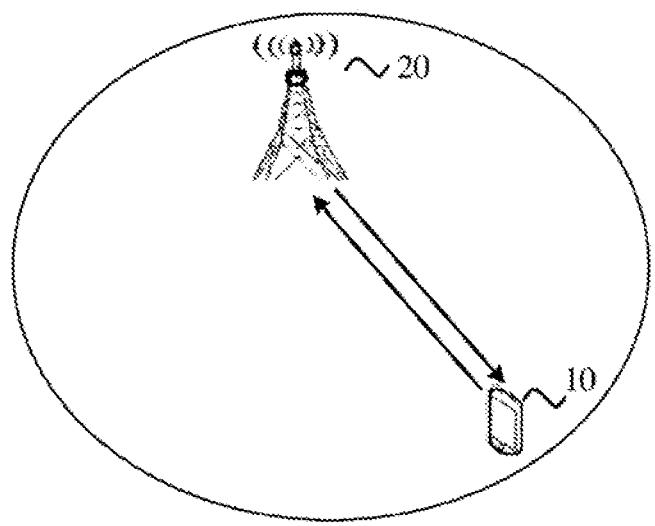
FIG. 1 shows a schematic diagram of an application scenario of an embodiment of the present disclosure.

Technical solution in the embodiments of the present disclosure will be described clearly and completely below with reference to the drawings in the embodiments of the present disclosure.

It should be understood that the technical solutions of the embodiments of the present disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolved (LTE) system, Frequency Division Duplex (FDD) system, Time Division Duplex (TDD), Universal Mobile Telecommunication System (UMTS), Worldwide Interoperability for Microwave Access (WIMAX) communication system, New Radio (NR) or future 5G system, or the like.

In particular, the technical solutions of the embodiments of the present disclosure can be applied to various communication systems that based on non-orthogonal multiple access technology, such as Sparse Code Multiple Access (SCMA) system, Low Density Signature (LDS) system, or the like. Of course, SCMA system and LDS system can also be referred to with other names in the field of communication. Further, the technical solutions of the embodiments of the present disclosure can be applied to a multicarrier transmission system adopting the non-orthogonal multiple access technology, for example, Orthogonal Frequency Division Multiplexing (OFDM), Filter Bank Multi-Carrier (FBMC), Generalized Frequency Division Multiplexing (GFDM), Filtered-OFDM (F-OFDM) system adopting the non-orthogonal multiple access technology, or the like.

The terminal device in the embodiments of the present disclosure can refer to a User Equipment (UE), an access terminal, a user unit, a user station, a mobile station, a mobile table, a remote station, a remote terminal, a mobile device, a user terminal, a terminal, a wireless communication device, a user agent or a user apparatus. The access terminal can be a cellular telephone, a cordless telephone, a Session Initiation Protocol (SIP) telephone, a Wireless Local Loop (WLL) station, a Personal Digital Assistant (PDA), a handheld device with wireless communication function, a computing device or other processing device connected to a wireless modem, a vehicle device, a wearable device, a terminal device in a future 5G network or a terminal device of a future evolved Public Land Mobile Network (PLMN), which is not limited in the embodiments of the present disclosure.

The network device in the embodiment of the present disclosure can be a device for communication with a terminal device, which can be a Base Transceiver Station (BTS) of GSM or CDMA, or a NodeB (NB) in a WCDMA system, or can be an Evolutional NodeB (eNB or eNodeB) in a LTE system, can also be a wireless controller in a of Cloud Radio Access Network (CRAN) scenario, or the network device can be a relay station, an access point, a vehicle device, a wearable device, a network device in the future 5G network or a network device in the future evolved PLMN network, or the like, which is not limited in the embodiments of the present disclosure.

FIG. 1 is a schematic diagram of an application scenario of an embodiment of the present disclosure. The communication system in FIG. 1 may include a terminal device 10 and a network device 20. The network device 20 is configured to provide a communication service for the terminal device 10 and access a core network. The terminal device 10 accesses the network by searching a synchronization signal, a broadcast signal, or the like, sent by the network device 20, so as to communicate with the network. The arrows shown in FIG. 1 may represent uplink/downlink transmission over a cellular link between the terminal device 10 and the network device 20.

In the 3rd Generation Partnership Project (3GPP) of LTE system, the network can transmit paging to a UE that is in an idle state. The paging process can be triggered by the core network or base station, and is configured to transmit a paging request to the UE that is in the idle state, or to inform the system of information update, and to inform UB to receive information such as Earthquake and Tsunami Warning System (ETWS) or Commercial Mobile Alert Service (CMAS). After receiving a paging message of the core network, the base station interprets contents therein, obtains a Tracking Area Identity (TAI) list of the UE, and performs paging for an air interface in a cell belonging to a tracking area in the list.

In a system bandwidth, there is a paging bandwidth for carrying a paging message. The paging bandwidth in the prior art is likely to be greater than a bandwidth capacity of the terminal device being paged, which causes that the terminal device being paged cannot receive its own paging message.

In this case, the embodiments of the present disclosure provides a paging method, which can avoid the above problem.

It should be understood that terms "system" and "network" are often used interchangeably herein. The term "and/or" used herein merely refers to an association relationship describing associated objects, indicating that there may be three relationships, for example, A and/or B may indicate three cases: A exists separately, both A and B exist, or B exists separately. In addition, the character "/" used herein generally indicates that there is a "or" relationship between contextual objects.

Figure 2:
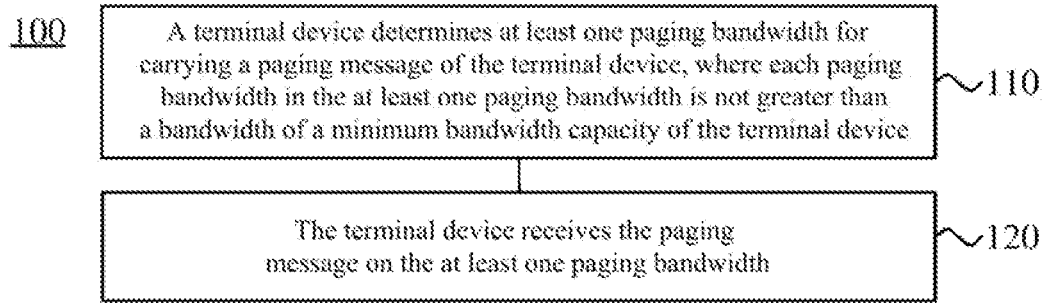
FIG. 2 shows a schematic block diagram of a paging method according to an embodiment of the present disclosure.

FIG. 2 shows a schematic block diagram of a paging method 100 according to an embodiment of the present disclosure. As shown in FIG. 2, the method 100 includes some or all of the following contents:

S110, the terminal device determines at least one paging bandwidth for carrying a paging message of the terminal device, where each paging bandwidth in the at least one paging bandwidth is not greater than a bandwidth of a minimum bandwidth capacity of the terminal device.

S120, the terminal device receives the paging message on the at least one paging bandwidth.

A network device can configure a plurality of paging bandwidths within a system bandwidth, and each paging bandwidth could not be greater than the bandwidth of the minimum bandwidth capacity of the terminal device, for example, 10 MHz. In this way, it can prevent some terminal devices from being unable to receive a paging message because their bandwidth capacity is less than a respective paging bandwidth. The network device can configure a paging bandwidth for each terminal device, or a plurality of paging bandwidths for each terminal device, so as to reduce a congestion of paging message transmission. The network device can periodically configure the paging bandwidths, which can improve flexibility. For example, the network device can determine bandwidth capacities of all terminal devices in a cell it covers at a certain moment in advance, and configure paging bandwidths in a system bandwidth according to a minimum bandwidth capacity, so that each paging bandwidth is not greater than a bandwidth of the minimum bandwidth capacity, thereby all terminal devices in the cell covered by the network device can receive a paging message. The network device can transmit the paging message to the terminal device on the at least one paging bandwidth. The terminal device can first determine its own paging bandwidth, and then receive its own paging message on its own paging bandwidth.

Therefore, in the paging method of the embodiment of the present disclosure, considering the bandwidth of the minimum bandwidth capacity of the terminal device when configuring the paging bandwidth, the problem that the terminal device cannot receive the paging message due to the insufficient bandwidth capacity of the terminal device can be avoided.

The paging bandwidth is illustrated first, the so called paging bandwidth is defined to carry the paging message, but it does not exclude that some other information is also carried on the paging bandwidth, such as synchronization information, or the like. The paging bandwidth in the embodiment of the present disclosure is defined in a frequency domain. Different paging bandwidths can be completely or partially overlapped in the frequency domain without limitation in the time domain. That is to say, the paging bandwidth can be completely overlapped in the time domain. For example, if the system bandwidth is 40 MHZ, resources of the highest 10 MHz and the lowest 10 MHz on the same symbol can be used as two paging bandwidths.

In the embodiment of the present disclosure, the method further includes: the terminal device determines a plurality of paging bandwidths for carrying a paging message, where each paging bandwidth in the plurality of paging bandwidths is not greater than the bandwidth of the minimum bandwidth capacity; the terminal device determining at least one paging bandwidth for carrying a paging message of the terminal device, includes: the terminal device determining the at least one paging bandwidth from the plurality of paging bandwidths.

The terminal device can determine a plurality of paging bandwidths configured by the network device in the system bandwidth, and further, the terminal device can determine at least one paging bandwidth of its own from the plurality of paging bandwidths. For example, the terminal device can first determine an identity of the at least one paging bandwidth of its own. In case the terminal device obtains frequency domain positions of the plurality of paging bandwidths in advance, the terminal device can know a frequency domain position of the at least one paging bandwidth of its own. It should be understood that the plurality of paging bandwidths in the system bandwidth can be configured in advance by the network device or agreed according to a protocol, for example, it can be preset in the terminal device. On the other hand, the terminal device can obtain the at least one paging bandwidth of its own without combining all paging bandwidths in the system bandwidth. For example, the at least one paging bandwidth is directly indicated in a paging instruction information, so that the terminal device can directly determine the at least one paging bandwidth of its own according to the paging instruction information.

In NR, a large-bandwidth carrier is supported, and a carrier bandwidth can reach 400 MHz. For the network side, there is no problem to support the large-bandwidth carrier, but for a UE, as limited by constraints such has cost, power, or the like, a maximum bandwidth supported is limited by the UE's capacity. Therefore, one or more bandwidth parts (BWPs) are configured for a large-bandwidth carrier, and each BWP can contain a set of continuous PRBs. For a UE, in a service cell, it is allowed to exist at most one active Downlink (DL) BWP and at most one active Uplink (UL) BWP at the same time. Before the UE is configured with a BWP, there is an initial active DL/UL BWP. During or after an establishment process of a Radio Resource Control (RRC) connection, an active DL/UL BWP can be configured for the UE.

The plurality of paging bandwidths defined in the system bandwidth can be distributed to a plurality of different BWPs, so that the loads being paged can be averaged on different BWPs, and part of the paging bandwidths from the plurality of paging bandwidth can also be in the same BWP For example, the plurality of paging bandwidths can be partially or completely overlapped in the same BWP in the frequency domain.

In the embodiment of the present disclosure, the method further includes: the terminal device receives configuration information, which is sent by the network device, of the plurality of paging bandwidths; the terminal device determining at least one paging bandwidth for carrying a paging message of the terminal device, includes: the terminal device determining a frequency domain position of each paging bandwidth in the at least one paging bandwidth according to an identity of the terminal device and the configuration information of the plurality of paging bandwidths.

The terminal device can determine the frequency domain position of the at least one paging bandwidth of its own according to its identity (ID). For example, UE_UD=(International Mobile Subscriber Identification Number (IMSI) mod 1024), paging bandwidth index=UE_ID mod N, where N is the number of all paging bandwidths in the system bandwidth. The network device can indicate the configuration information of the plurality of paging bandwidths in the system bandwidth to the terminal device, then the terminal device can know frequency domain positions of all paging bandwidths, and the terminal device can thus determine the frequency domain position of its own paging bandwidth according to a determined index of its own paging bandwidth.

In the embodiment of the present disclosure, the configuration information of the plurality of paging bandwidths includes frequency domain position information of each paging bandwidth in the plurality of paging bandwidths and/or frequency domain offset information of each paging bandwidth in the plurality of paging bandwidths.

The network device can directly indicate the frequency domain position of each paging bandwidth in the plurality of paging bandwidths to the terminal device, or indirectly indicate it through a frequency domain offset. For example, the network device can indicate through an offset of the paging bandwidth with respect to a frequency domain position of a Synchronization Signal Block (SSB), or an offset of the paging bandwidth with respect to a frequency domain position of a broadcast signal, or the like. The network device can indicate through an offset of the paging bandwidth with respect to a frequency domain position of a center frequency point of the system bandwidth, and the network device can also indicate through a frequency domain position of a BWP. For example, the network device can inform the terminal device of configuration information of each BWP in advance, and the network device informs the terminal device that the number of the paging bandwidths is the same as the number of BWPs configured by the network. That is to say, each BWP is configured with a paging bandwidth, and the terminal device can obtain that each paging bandwidth occupies the middle 10 MHz of the BWP where it locates in advance. Once the terminal device obtains the configuration information of each BWP, it can obtain the frequency domain position occupied by each paging bandwidth.

In the embodiment of the present disclosure, the configuration information of the plurality of paging bandwidths is carried in remaining minimum system information (RMSI). If the paging bandwidths are configured by the network device, the network device can inform the terminal device of the configuration information of the plurality of paging bandwidths through a system message. For example, the system message can be the Remaining minimum system information (RMSI) or other system information (OSI).

In the embodiment of the present disclosure, the plurality of paging bandwidths belong to a plurality of paging bandwidth sets, the plurality of paging bandwidth sets respectively correspond to a plurality groups of paging parameters, and the paging parameters are used to determine a paging frame and/or a paging occasion.

After the terminal device obtains its own paging bandwidth, the terminal device also needs to know its own paging parameters. For example, the terminal device needs to know its own paging occasion (PO), so that the terminal device can receive the paging message at the corresponding time. It is understood by those skilled in the art, after receiving the paging message of the core network, the base station can summarize the paging message of UEs with the same as PO into one paging message and transmit it to a relevant UE through a paging channel. UE receives paging parameters through a system message, calculates PO with its own IMSI, and receives the paging message at the corresponding time. The paging message is carried by a Physical Downlink Shared Channel (PDSCH). UE obtains paging indication information by detecting a Physical Downlink Control Channel (PDCCH) scrambled by a Paging-Radio Network Temporary Identity (P-RNTI), and thereby receives the paging message. UE that is in an idle state can save power through Discontinuous Reception (DRX), UE obtains DRX related information from the system message. In a PO on a paging frame (PF) of a DRX period, the paging message is received by monitoring the PDCCH scrambled by the P-RNTI. PF indicates on which system frame number the paging message should appear, and PO indicates a possible sub-frame moment.

Paging parameters can be independently configured for different paging bandwidths, or the plurality of paging bandwidths can be divided into a plurality of paging bandwidth sets. A group of paging parameters can be independently configured for paging bandwidth in each paging bandwidth set. That is to say, paging parameters corresponding to different paging bandwidth sets can be independently configured, while paging parameters of paging bandwidths in the same paging bandwidth set are commonly configured. The number of paging bandwidth in each paging bandwidth set can be the same or different. For example, a first paging bandwidth set includes one paging bandwidth, and a second paging bandwidth set can include two paging bandwidths. The paging bandwidths belonging to the same BWP can also be divided into the same paging bandwidth set.

By independently configuring paging parameters of different paging bandwidths or different bandwidth sets, the network device has certain flexibility when transmitting a paging message.

For different paging bandwidths, the network device can also use different beams to transmit the paging message to the terminal device, and different beams can perform time-shared transmission in Time-Division Multiplexing (TDM) mode, so as to improve a resource utilization.

In the embodiment of the present disclosure, the paging parameters are carried in: remaining minimum system information (RMSI) or other system information (OSI).

It can be seen from the above description, the network device can inform the paging parameters of the paging bandwidth through the system message. For example, the system message can be in the RMSI or OSI.

Figure 3:
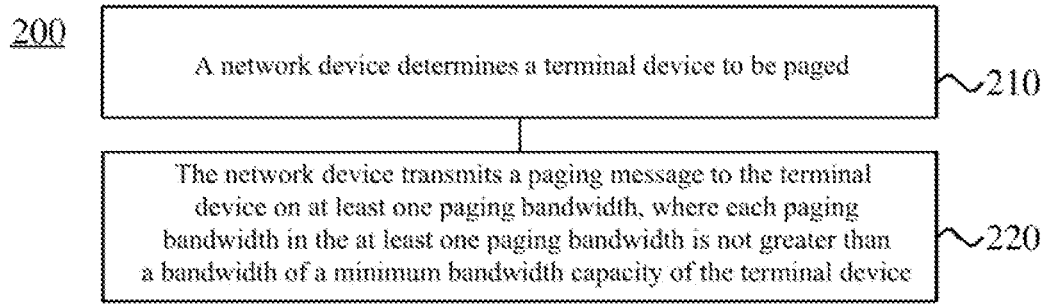
FIG. 3 shows another schematic block diagram of a paging method according to an embodiment of the present disclosure.

FIG. 3 shows a schematic block diagram of a paging method 200 according to an embodiment of the present disclosure. As shown in FIG. 3, the method 200 includes some or all of the following contents:

S210, the network device determines a terminal device to be paged.

S220, the network device transmits a paging message to the terminal device on at least one paging bandwidth, where each paging bandwidth in the at least one paging bandwidth is not greater than a bandwidth of a minimum bandwidth capacity of the terminal device.

Therefore, in the paging method of the embodiment of the present disclosure, by considering the bandwidth of the minimum bandwidth capacity of the terminal device when configuring the paging bandwidth, the problem that the terminal device cannot receive the paging message due to the insufficient bandwidth capacity of the terminal device can be avoided.

In the embodiment of the present disclosure, the method also includes: the network device transmits configuration information of a plurality of paging bandwidths for carrying a paging message to the terminal device, where the configuration information of the plurality of paging bandwidths is used for the terminal device to determine frequency domain position of the at least one paging bandwidth, where each paging bandwidth in the plurality of paging bandwidths is not greater than the bandwidth of the minimum bandwidth capacity.

In the embodiment of the present disclosure, the configuration information of the plurality of paging bandwidths includes frequency domain position information of each paging bandwidth in the plurality of paging bandwidths and/or frequency domain offset information of each paging bandwidth in the plurality of paging bandwidths.

In the embodiment of the present disclosure, the configuration information of the plurality of paging bandwidths is carried in remaining minimum system information (RMSI).

In the embodiment of the present disclosure, frequency domain positions of at least two of the plurality of paging bandwidths are incompletely overlapped.

In the embodiment of the present disclosure, the plurality of paging bandwidths belong to a plurality of paging bandwidth sets, the plurality of paging bandwidth sets respectively correspond to a plurality groups of paging parameters, and the paging parameters are used to determine a paging frame and/or a paging occasion.

In the embodiment of the present disclosure, paging bandwidths of the same paging bandwidth set belongs to the same bandwidth part (BWP).

In the embodiment of the present disclosure, the paging parameters are carried in remaining minimum system information (RMSI) or other system information (OSI).

It should be understood that an interaction between the network device and the terminal device, a relevant characteristic and a function described by the network device correspond to the relevant characteristic and function of the terminal device. The relevant contents have been described in detail in the above method 100, which, for the sake of brevity, will not be repeated herein.

It should also be understood that, in various embodiments of the present disclosure, the sequence numbers of the above processes do not imply an execution order. The execution order of the processes should be determined by their functions and internal logic, but is not intended to limit an implementation in the embodiments of the present disclosure.

The paging methods according to the embodiments of the present disclosure are described in detail above. The paging apparatuses according to the embodiments of the present disclosure will be described with reference to FIGS. 4 to 7. The technical features described in the method embodiments are applicable to the following apparatus embodiments.

Figure 4:
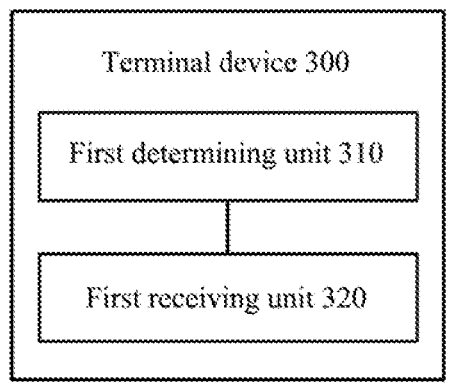
FIG. 4 shows a schematic block diagram of a terminal device according to an embodiment of the present disclosure.

FIG. 4 shows a schematic block diagram of a terminal device 300 of an embodiment of the present disclosure. As shown in FIG. 4, the terminal device 300 includes:

a first determining unit 310, configured to determine at least one paging bandwidth for carrying a paging message of the terminal device, where each paging bandwidth in the at least one paging bandwidth is not greater than a bandwidth of a minimum bandwidth capacity of the terminal device; and a first receiving unit 320, configured to receive the paging message on the at least one paging bandwidth.

Therefore, in the terminal device according to the embodiment of the present disclosure, by considering the bandwidth of the minimum bandwidth capacity of the terminal device when configuring the paging bandwidth, the problem that the terminal device cannot receive the paging message due to the insufficient bandwidth capacity of the terminal device can be avoided.

In the embodiment of the present disclosure, the terminal device further includes; a second determining unit, configured to determine a plurality of paging bandwidths for carrying a paging message, where each paging bandwidth in the plurality of paging bandwidths is not greater than the bandwidth of the minimum bandwidth capacity; the first determining unit is configured to: determine at least one paging bandwidth from the plurality of paging bandwidth In the embodiment of the present disclosure, the terminal device further includes: a second receiving unit, configured to receive configuration information, which is sent by the network device, of the plurality of paging bandwidths; the first determining unit is configured to: determine a frequency domain position of each paging bandwidth in the at least one paging bandwidth according to an identity of the terminal device and the configuration information of the plurality of paging bandwidths.

In the embodiment of the present disclosure, the configuration information of the plurality of paging bandwidths includes frequency domain position information of each paging bandwidth in the plurality of paging bandwidths and/or frequency domain offset information of each paging bandwidth in the plurality of paging bandwidths.

In the embodiment of the present disclosure, the configuration information of the plurality of paging bandwidths is carried in remaining minimum system information (RMSI).

In the embodiment of the present disclosure, frequency domain positions of at least two of the plurality of paging bandwidths are incompletely overlapped.

In the embodiment of the present disclosure, the plurality of paging bandwidths belong to a plurality of paging bandwidth sets, the plurality of paging bandwidth sets respectively correspond to a plurality groups of paging parameters, and the paging parameters are used to determine a paging frame and/or a paging occasion.

In the embodiment of the present disclosure, paging bandwidths of the same paging bandwidth set belongs to the same bandwidth part (BWP).

In the embodiment of the present disclosure, the paging parameters are carried in remaining minimum system information (RMSI) or other system information (OSI).

It should be understood that the terminal device 300 according to the embodiment of the present disclosure can correspond to the terminal device in the method embodiment of the present disclosure, and the above and other operations and/or functions of each unit in the terminal device 300 are respectively configured to realize the corresponding process of the terminal device in the method of FIG. 2, which, for the sake of brevity, will not be repeated herein.

Figure 5:
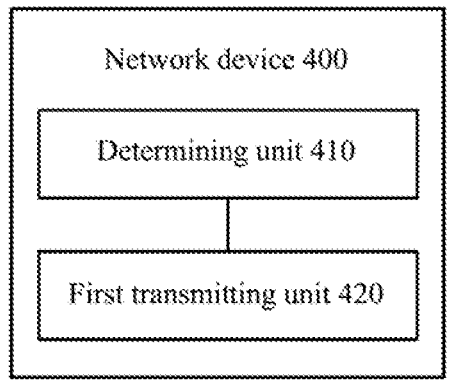
FIG. 5 shows a schematic block diagram of a network device according to an embodiment of the present disclosure.

FIG. 5 shows a schematic block diagram of the network device 400 according to the embodiment of the present disclosure. As shown in FIG. 5, the network device 400 includes:
- a determining unit 410, configured to determine a terminal device to be paged; and
- a first transmitting unit 420, configured to transmit a paging message to the terminal device on at least one paging bandwidth, where each paging bandwidth in the at least one paging bandwidth is not greater than a bandwidth of a minimum bandwidth capacity of the terminal device.

Therefore, in the network device according to the embodiment of the present disclosure, by considering the bandwidth of the minimum bandwidth capacity of the terminal device when configuring the paging bandwidth, the problem that the terminal device cannot receive the paging message due to the insufficient bandwidth capacity of the terminal device can be avoided.

In the embodiment of the present disclosure, the network device further includes; a second transmitting unit, configured to transmit configuration information of a plurality of paging bandwidths for carrying a paging message to the terminal device, where the configuration information of the plurality of paging bandwidths is used for the terminal device to determine frequency domain position of the at least one paging bandwidth, where each paging bandwidth in the plurality of paging bandwidths is not greater than the bandwidth of the minimum bandwidth capacity.

In the embodiment of the present disclosure, the configuration information of the plurality of paging bandwidths includes frequency domain position information of each paging bandwidth in the plurality of paging bandwidths and/or frequency domain offset information of each paging bandwidth in the plurality of paging bandwidths.

In the embodiment of the present disclosure, the configuration information of the plurality of paging bandwidths is carried in remaining minimum system information (RMSI).

In the embodiment of the present disclosure, frequency domain positions of at least two of the plurality of paging bandwidths are incompletely overlapped.

In the embodiment of the present disclosure, the plurality of paging bandwidths belong to a plurality of paging bandwidth sets, the plurality of paging bandwidth sets respectively correspond to a plurality groups of paging parameters, and the paging parameters are used to determine a paging frame and/or a paging occasion.

In the embodiment of the present disclosure, paging bandwidths of the same paging bandwidth set belongs to the same bandwidth part (BWP).

In the embodiment of the present disclosure, the paging parameters are carried in remaining minimum system information (RMSI) or other system information (OSI).

It should be understood that the network device 400 according to the embodiment of the present disclosure can correspond to the network device in the method embodiment of the present disclosure, and the above and other operations and/or functions of each unit in the network device 400 are respectively configured to realize the corresponding flow of the network device in the method of FIG. 3, which, for the sake of brevity, will not be repeated herein.

Figure 6:
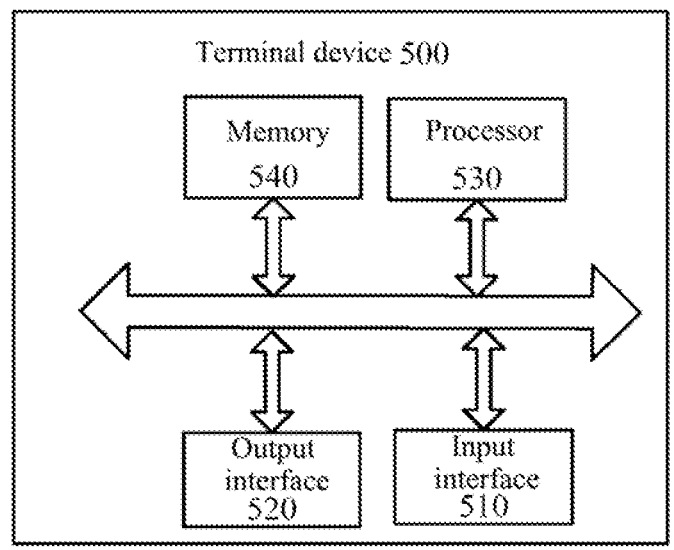
FIG. 6 shows another schematic block diagram of a terminal device according to an embodiment of the present disclosure.

As shown in FIG. 6, the embodiment of the present disclosure further provides a terminal device 500, which can be the terminal device 300 in FIG. 4, and can be configured to execute the content of the terminal device corresponding to the method 100 in FIG. 2. The terminal device 500 includes an input interface 510, an output interface 520, a processor 530, and a memory 540. The input interface 510, the output interface 520, the processor 530, and the memory 540 can be connected through a bus system. The memory 540 is configured to store programs, instructions or codes. The processor 530 is configured to execute the programs, instructions or codes in the memory 540 to control the input interface 510 to receive a signal, control the output interface 520 to transmit a signal, and complete the operation in the aforementioned method embodiment.

Therefore, in the terminal device of the embodiment of the present disclosure, by considering the bandwidth of the minimum bandwidth capacity of the terminal device when configuring the paging bandwidth, the problem that the terminal device cannot receive the paging message due to the insufficient bandwidth capacity of the terminal device can be avoided.

It should be understood that in the embodiment of the present disclosure, the processor 530 can be a Central Processing Unit (CPU), and the processor 530 can also be other general-purpose processors, digital signal processors, special integrated circuits, field programmable gate arrays or other programmable logic devices, discrete gate or transistor logic devices, discrete hardware components, or the like. The general-purpose processor may be a microprocessor, or the processor may be any conventional processor, or the like.

The memory 540 may include a read-only memory and a random access memory and provide instructions and data to the processor 530. A portion of the memory 540 may also include a non-volatile random access memory. For example, the memory 540 may also store information of a device type.

In the implementation process, each content of the above method can be completed through an integrated logic circuit of a hardware in the processor 530 or an instruction in the form of software. The content of the method disclosed in combination with the embodiment of the present disclosure can be directly embodied as being executed by a hardware processor, or being executed by a combination of hardware and software modules in the processor. The software module can be located in a random memory, a flash memory, a read-only memory, a programmable read-only memory or an electrically erasable programmable memory, a register and other mature storage medium in the art. The storage medium is located in the memory 540, and the processor 530 reads information in the memory 540 and completes the contents of the above method in combination with its hardware, which, for the sake of avoiding repetition, will not be described in detail herein.

In an implementation, the first receiving unit and the second receiving unit in the terminal device 300 may be implemented by the input interface 510 in FIG. 6, and the first determining unit and the second determining unit in the terminal device 300 may be implemented by the processor 530 in FIG. 6.

Figure 7:
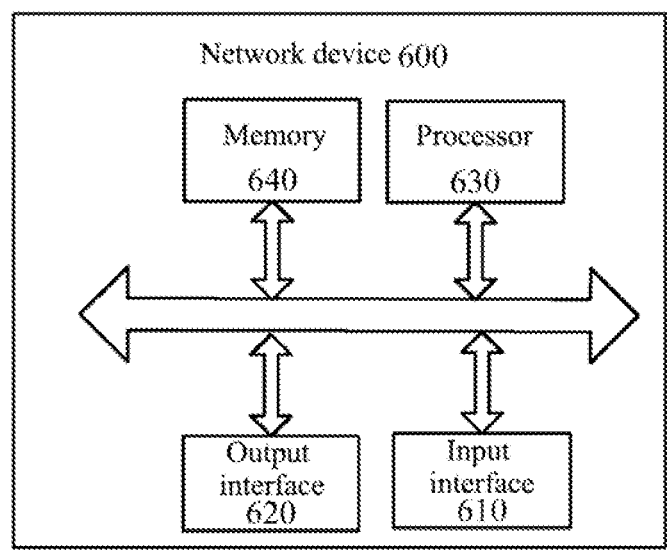
FIG. 7 shows another schematic block diagram of a network device according to an embodiment of the present disclosure.

As shown in FIG. 7, the embodiment of the present disclosure further provides a network device 600, which can be the network device 400 in FIG. 5, and can be configured to execute the content of the network device corresponding to the method 200 in FIG. 3. The network device 600 includes an input interface 610, an output interface 620, a processor 630, and a memory 640. The input interface 610, the output interface 620, the processor 630, and the memory 640 can be connected through a bus system. The memory 640 is configured to store programs, instructions or codes. The processor 630 is configured to execute the programs, instructions or codes in the memory 640 to control the input interface 610 to receive a signal, control the output interface 620 to transmit a signal, and complete the operation in the above described method embodiment.

Therefore, in the network device of the embodiment of the present disclosure, by considering the bandwidth of the minimum bandwidth capacity of the terminal device when configuring the paging bandwidth, the problem that the terminal device cannot receive the paging message due to the insufficient bandwidth capacity of the terminal device can be avoided.

It should be understood that in the embodiment of the present disclosure, the processor 630 can be a central processing unit (CPU), and the processor 630 can also be other general-purpose processors, digital signal processors, special integrated circuits, field programmable gate arrays or other programmable logic devices, discrete gate or transistor logic devices, discrete hardware components, or the like. The general-purpose processor may be a microprocessor, or the processor may be any conventional processor or the like.

The memory 640 may include a read-only memory and a random access memory and provide instructions and data to the processor 630. A portion of the memory 640 may also include a non-volatile random access memory. For example, the memory 640 may also store information of a device type.

In the implementation process, each content of the above method can be completed through an integrated logic circuit of a hardware in the processor 630 or an instruction in the form of software. The content of the method disclosed in combination with the embodiment of the present disclosure can be directly embodied as being executed by a hardware processor, or being executed by a combination of hardware and software modules in the processor. The software module can be located in a random memory, a flash memory, a read-only memory, a programmable read-only memory or an electrically erasable programmable memory, a register and other mature storage medium in the art. The storage medium is located in the memory 640, and the processor 630 reads information in the memory 640 and completes the contents of the above method in combination with its hardware, which, for the sake of avoiding repetition, will not be described in detail herein.

In an implementation, the first transmitting unit and the second transmitting unit in the network device 400 may be implemented by the output interface 620 in FIG. 7. The determining unit in the network device 400 may be implemented by the processor 630 in FIG. 7.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on applications and design constraints of the technical solution. A person skilled in the art may use different methods to implement the described functions with respect to each particular disclosure, but such implementation should not be considered to go beyond the scope of the present disclosure.

Those skilled in the art can clearly understand that, for convenience and brevity of the description, reference may be made to the corresponding processes in the above method embodiments for operation processes of the systems, the apparatuses and the units described above, and details will not be described herein again.

In the embodiments provided in the present disclosure, it should be understood that the disclosed systems, apparatuses, and methods may be implemented in other manners. For example, the apparatus embodiments described above are merely illustrative. For example, the division of the units is a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses of units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solution of the embodiments.

In addition, the functional units in the embodiments of the present disclosure may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present disclosure, or a part of the technical solution of the present disclosure contributing to the prior art, or a part of the technical solution may be embodied in the form of a software product which is stored in a storage medium, including instructions for enabling a computer device (which may be a personal computer, a server, or the network device, or the like.) to perform all or part of the steps of the embodiments of the present disclosure. The above storage medium includes: various mediums capable of storing program codes, such as a USB flash disk, a mobile hard disk, a read-only memory (ROM), a random access memory (RAM), a magnetic disk, an optical disk, or the like.

The above description is embodiments of the present disclosure, but the protection scope of the present disclosure is not limited thereto. Any modification or substitution conceived by persons skilled in the art within the technical scope of the present disclosure should be covered in the protection scope of the present disclosure. Therefore, the protection scope of the present disclosure is subject to the protection scope of the appended claims.

What is claimed is:

1. A paging method, comprising:
   transmitting, by a network device, configuration information to a terminal device, wherein the configuration information is used to configure a plurality of paging bandwidths for the terminal device; and
   transmitting, by the network device, a paging message to the terminal device;
   wherein the configuration information comprises configuration of a plurality of bandwidth parts (BWPs), each of the plurality of BWPs having a one to one corresponding relationship with a paging bandwidth of the plurality of paging bandwidths, wherein each BWP comprises one paging bandwidth, the paging bandwidth being part of the BWP, and the configuration information comprises frequency domain position information of each of the plurality of paging bandwidths.

2. The method according to claim 1, wherein the configuration information is carried in a system message.

3. The method according to claim 1, wherein each of the plurality of paging bandwidths is located in a different BWP.

4. The method according to claim 1, further comprising:
   transmitting, by the network device, indication information to the terminal device, wherein the indication information is used for the terminal device to determine a first paging bandwidth.

5. The method according to claim 4, wherein the first paging bandwidth is one of the plurality of paging bandwidths.

6. The method according to claim 4, wherein the transmitting, by the network device, indication information to the terminal device comprises:
   transmitting, by the network device, indication information to the terminal device through a physical downlink control channel (PDCCH).

7. The method according to claim 1, wherein the plurality of paging bandwidths are located in a system bandwidth.

8. The method according to claim 1, wherein each of the plurality of paging bandwidths is no larger than a minimum bandwidth capability of the terminal device.

9. A network device, comprising: an input interface, an output interface, a memory, a processor, and a computer program stored on the memory and operable on the processor, wherein the processor, when running the computer program, is configured to:
   transmit configuration information to a terminal device, wherein the configuration information is used to configure a plurality of paging bandwidths for the terminal device; and
   transmit a paging message to the terminal device;
   wherein the configuration information comprises configuration of a plurality of bandwidth parts (BWPs), each of the plurality of BWPs having a one to one corresponding relationship with a paging bandwidth of the plurality of paging bandwidths, wherein each BWP comprises one paging bandwidth, the paging bandwidth being part of the BWP, and the configuration information comprises frequency domain position information of each of the plurality of paging bandwidths.

10. The network device according to claim 9, wherein the configuration information is carried in a system message.

11. The network device according to claim 9, wherein each of the plurality of paging bandwidths is located in a different BWP.

12. The network device according to claim 9, wherein the processor, when running the computer program, is further configured to:
   transmit indication information to the terminal device, wherein the indication information is used for the terminal device to determine a first paging bandwidth.

13. The network device according to claim 12, wherein the first paging bandwidth is one of the plurality of paging bandwidths.

14. The network device according to claim 12, wherein the processor, when running the computer program, is further configured to:
   transmit indication information to the terminal device through a physical downlink control channel (PDCCH).

15. The network device according to claim 9, wherein the plurality of paging bandwidths are located in a system bandwidth.

16. The network device according to claim 9, wherein each of the plurality of paging bandwidths is no larger than a minimum bandwidth capability of the terminal device.

* * * * *